US006445394B1

(12) United States Patent
Chow et al.

(10) Patent No.: US 6,445,394 B1
(45) Date of Patent: Sep. 3, 2002

(54) SERIALIZED MAPPED MEMORY CONFIGURATION FOR A VIDEO GRAPHICS CHIP

(75) Inventors: Hugh Chow, Lipincott Court; Milivoje M. Aleksic, Richmond Hill; Adrian Hartog, Toronto, all of (CA)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/212,197

(22) Filed: Dec. 15, 1998

(51) Int. Cl.[7] .................................................. G09G 5/39

(52) U.S. Cl. ........................ 345/532; 345/519; 345/567

(58) Field of Search ................................ 345/501, 502, 345/530–535, 519, 567; 710/126–129, 305, 306–309

(56) References Cited

U.S. PATENT DOCUMENTS 5,894,586 A * 4/1999 Marks et al. .................. 710/28

\* cited by examiner

Primary Examiner—Kee M. Tung
(74) Attorney, Agent, or Firm—Vedder, Price, Kaufman & Kammholz

(57) ABSTRACT

A memory system and method uses common memory for multiple controllers associated with, for example, differing data manipulation functions, such as video graphics related functions or other suitable functions. A multiplexer, configured as a time slicer, selects data for transfer with the memory over a first bus at a first rate. The multichannel serializer is coupled between the multiplexer and a plurality of controllers through a plurality of second buses. Each of the second buses is associated with a different channel. The multichannel serializer has a serializer for each of the plurality of second buses wherein each of the serializers transfers data associated with a channel at a second rate associated with a corresponding controller.

28 Claims, 3 Drawing Sheets

SERIALIZED MAPPED MEMORY CONFIGURATION FOR A VIDEO GRAPHICS CHIP

FIELD OF THE INVENTION

The invention relates generally to systems and methods for accessing memory, and more particularly to systems and methods for providing access to a common memory for multiple memory controllers.

BACKGROUND OF THE INVENTION

In video graphics controller chips and other chips that employ memories, many different memories may be distributed throughout a die. For example, with conventional video graphics controller chips, there may be separate memory for a display buffer, color converter and other functions. These memories typically are different sizes having differing numbers of address and data lines. Moreover, there are typically separate memory controllers for each type of memory. Some memories may be single port, dual port or tri-port memories. Each may use differing access formats or have a different clock for each memory. Consequently, there is an extended amount of overhead in terms of logic circuitry that is required for each portion of distributed memory. Such overhead logic may include, for example, decoders, drivers, control logic and other circuitry. Also, when connecting the controllers to respective memories, or when connecting one controller to multiple memories, a problem arises in having enough die space to route the appropriate buses. Due to the cost of such logic and the desire to increase the speed of operation, it is desirable to minimize the length of the bus lines as well as the number of bus lines, if possible. However, with the distributed memory of the different memory types, graphics controller chips and other chips have accumulated complex layout designs and additional memory control overhead circuitry.

Some graphics controller chips are known that have embedded memory as opposed to external memory, but the embedded memory again is typically designed to have an unnecessary amount of complexity in terms of redundant circuitry. In addition, such embedded systems often have distributed memories such as different size buffers for differing functionality performed by the graphics controller chip. For example, one memory may have a bit width of 64 bits and another memory may have a bit width of 128 bits. Therefore, a system can have difficulty sharing data between memories directly or when they need to multiplex data from the differing memories. For example, there may be a desire to use the same data in memory by differing circuitry such as a display engine and a 3D drawing engine. However, these engines may require data at different rates and over different buses.

One suggested solution has been to combine memories into one memory. However, such designs may include, for example, a memory having a wider data width than practically desirable. For example, if all graphics controller engines require access to a memory, data may have to be transferred on the order of 10 gigabits per seconds or more. In order to move data in and out of such a memory, the memory width will typically have to be very wide which will subsequently require, for example, an unnecessarily high number of address lines.

In addition, the use of serialization to reduce electromagnetic interference is known. For example, for chip to chip serial communication a low voltage differential swing (LVDS) communication standard designed by National Semiconductor, Inc. uses serializers to communicate red, green and blue (RGB) data (and other data if desired) to reduce electromagnetic interference. However, such applications are not typically used to facilitate the combination of memory access for multiple controllers.

Another memory access mode, sometimes referred to as page mode, can provide very high memory throughput at peak times, however, it is not typically capable of sustaining its peak throughput continuously across page boundaries and has a limited page size. So at higher throughputs, if an address in on another page, it can take long time periods to switch pages to obtain the data.

Consequently, there exists a need for an improved memory system for use with integrated circuits to reduce redundancy from distributed memory configurations. It would be desirable if such a system facilitated a high band width transfer of data using a smaller data bus to facilitate communication of information from a common memory to multiple controllers.

DETAILED DESCRIPTION OF A PREFERRED EMBODIMENT OF THE INVENTION

Briefly, a memory system and method uses common memory for multiple controllers associated with, for example, differing data manipulation functions, such as video graphics related functions or other suitable functions. A multiplexer, configured as a time slicer, selects data for transfer with the memory over a first bus at a first rate. The multichannel serializer is coupled between the multiplexer and a plurality of controllers through a plurality of second buses. Each of the second buses is associated with a different channel. The multichannel serializer has a serializer for each of the plurality of second buses wherein each of the serializers transfers data associated with a channel at a second rate associated with a corresponding controller. Hence, the multiplexer and multichannel serializer facilitate multiple controller access to the common memory. Each controller may have a deserializer to convert per channel serialized data for its particular use.

Figure 1:
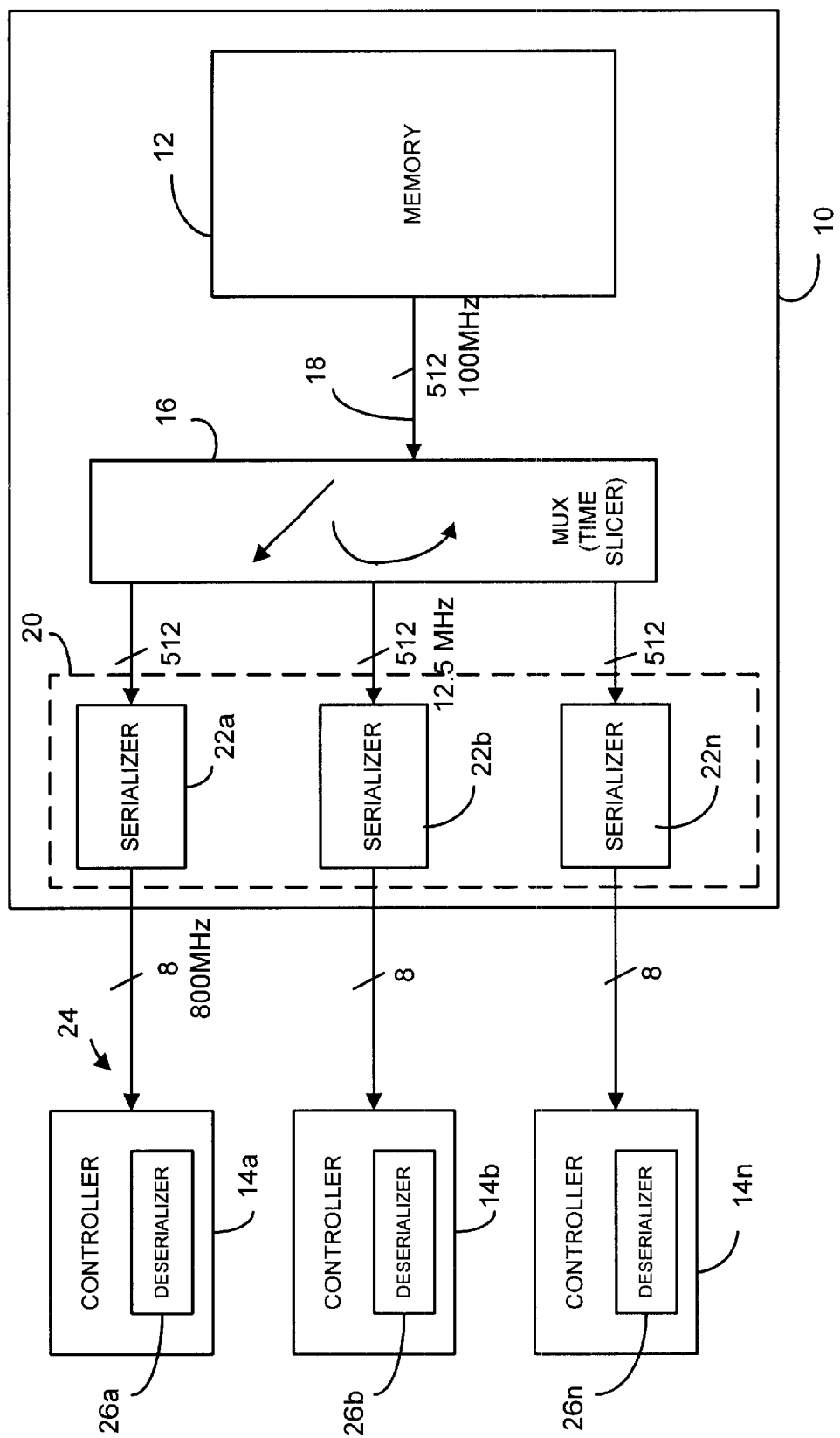
FIG. 1 is a block diagram illustrating one embodiment of the invention.

FIG. 1 shows a memory system 10 having memory 12 containing data for a plurality of controllers 14a through 14n. The memory system 10 includes a multiplexer 16 configured as a time slicer which is coupled to the memory 12 and operative to select data for transfer with the memory based on timer 17, over a first bus 18, at a first rate, such as about 100 MHz, by way of example. The memory system 10 also includes a multichannel serializer 20 that includes a plurality of channel specific serializers 22a–22n. A plurality of shadow registers 23a–23n are interposed to temporarily store a packet of bits, such as 512 bits that are serially output using the serializer 20. The multichannel serializer 20 serves as a bank of channel specific serializers which in effect convert data from the memory from a parallel to serial format. Each controller 14a–14n includes a corresponding deserializer 26a–26n that deserializes data received from a corresponding serializer.

The multichannel serializer 20 is coupled between the multiplexer 16 and the plurality of controllers 14a–14n through a plurality of second buses generally indicated at 24. Each of the buses 24 is associated with a different channel. Each bus specific serializer 22a–22n is coupled with each of the buses 24. Each of the serializers 22a–22n transfers data associated with a channel at a second rate such as about 800 MHz, to a corresponding controller in the group of controllers 14a–14n. With this configuration, the multiplexer and multichannel serializer 16 and 20 facilitate multiple controller access to the common memory 12. The multichannel serializer 20 obtains data from the memory 12 through the multiplexer 16 at a third rate, for example 12.5 MHz, over a same size bus as bus 18. The above disclosed data transfer rates are given for purposes of example only. It will be recognized by one of ordinary skill in the art that any suitable transfer rates may be used.

By way of example, the multichannel serializer 20 may have, for example, at least eight serializers corresponding to eight channels wherein each channel includes at least eight signal lines. The controllers may obtain data for any suitable function. For example, a controller may obtain data from the memory for three-dimensional graphics manipulation while another controller may obtain data from the memory for video data display.

In this embodiment, the memory 12, multiplexer 16, multichannel serializer 20 and controllers 14a–14n are located on a same circuit die. The memory system 10 may be incorporated into a video graphics controller chip or other suitable chip that utilizes the common memory for multiple functions.

As shown, each of the channels 24 may be, for example, an eight line bus coupled between a controller and a corresponding serializer 22a–22n. The bus between the memory 12 and the multiplexer 16 may be any suitable size, but may be, for example, a 512 line bus as shown.

In operation, the multiplexer 16 time slices data coming from memory 12 into predetermined intervals such that each serializer is provided with data at a rate of 12.5 MHz in a round robin fashion. The timer 17 is configured as an 8-state timer/counter that runs continuously. Each state indicates the shadow register the slicer should be multiplexing the 512 bit of data to. Hence, under control of the timer 17, the multiplexer selects a next time serializer after a predetermined interval. The serializer 20 then continually converts the data from the multiplexer 16 to a serial output to a respective controller. The information is output at a substantially higher rate, for example, 800MHz. The high output rate is fast enough to allow access to the storage device 12 by a plurality of controllers.

Figure 2:
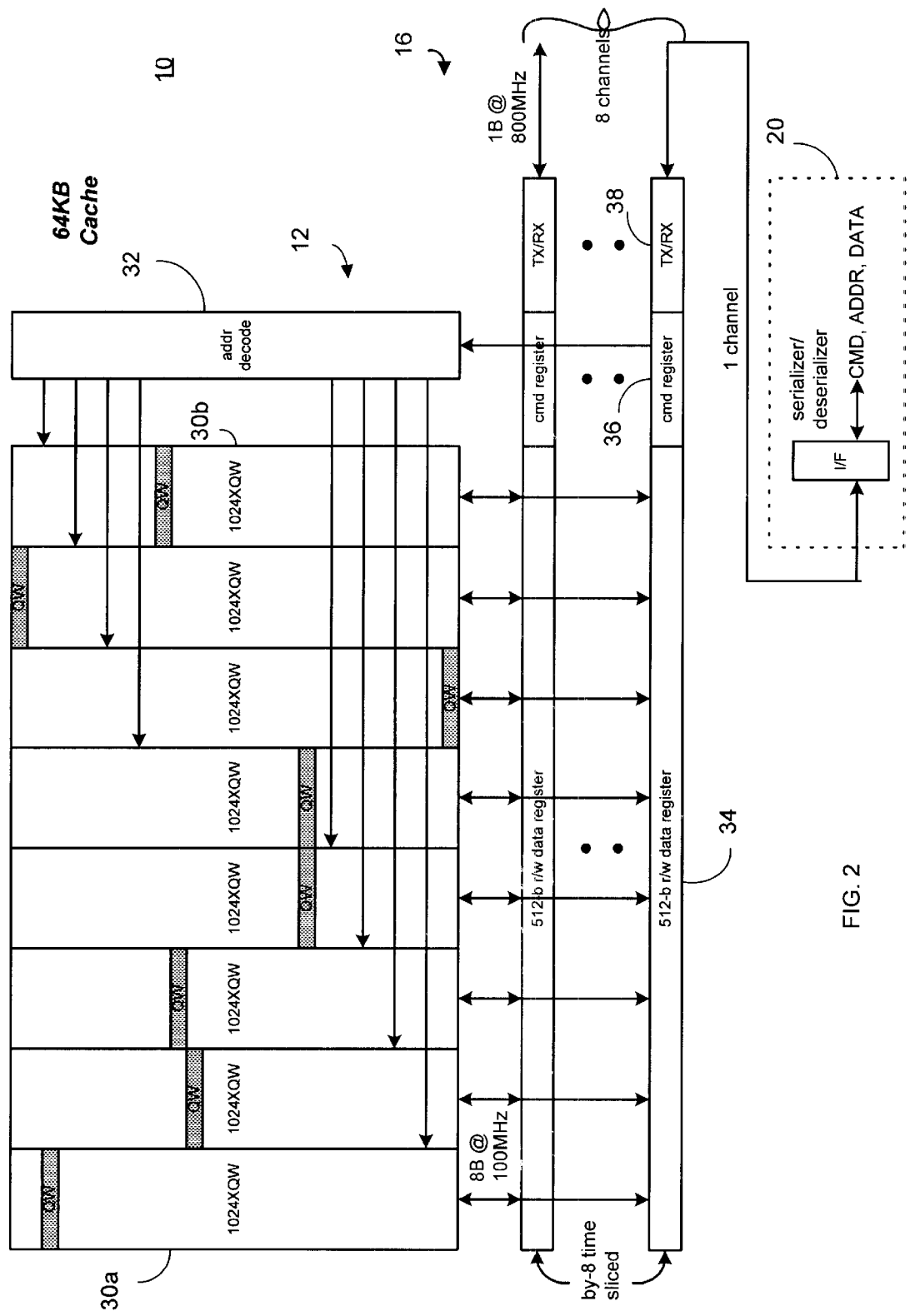
FIG. 2 is a block diagram illustrating one embodiment of the invention.

FIG. 2 shows one example of a memory system 10 having memory 12 such as a 64 kilobyte cache with banks of memory blocks 30a–30h configured, by way of example, as 1,024 by 8 bit blocks. The system reads a quad word during each cycle. An address decoder 32 decodes address data communicated in a time frame corresponding to a time slice. As shown, a time slice or time frame may include, for example 512 bits of data 34, command data 36 and transmit rewrite control data 38 which is communicated as one time slice (or frame) for a channel. The data communicated to and from the serializer 20 is shown as being transferred as 800 MHz. As shown, the serializer may include one read/write command register, eight address registers and an eight quad word data register (e.g., at 25.5 MHz), for example. The information communicated between the memory 12 and the time slicer 16 is shown to be 100 MHz.

The memory 12 is shown to be 512 bits wide. As such, the 64 kilobyte memory is shown as having eight read and write channels and one read and write command register (e.g., at 12.5 MHz) per channel. Eight quad word data read/write bits can be communicated per command. There is one address per quad word and eight addresses per command.

Figure 3:
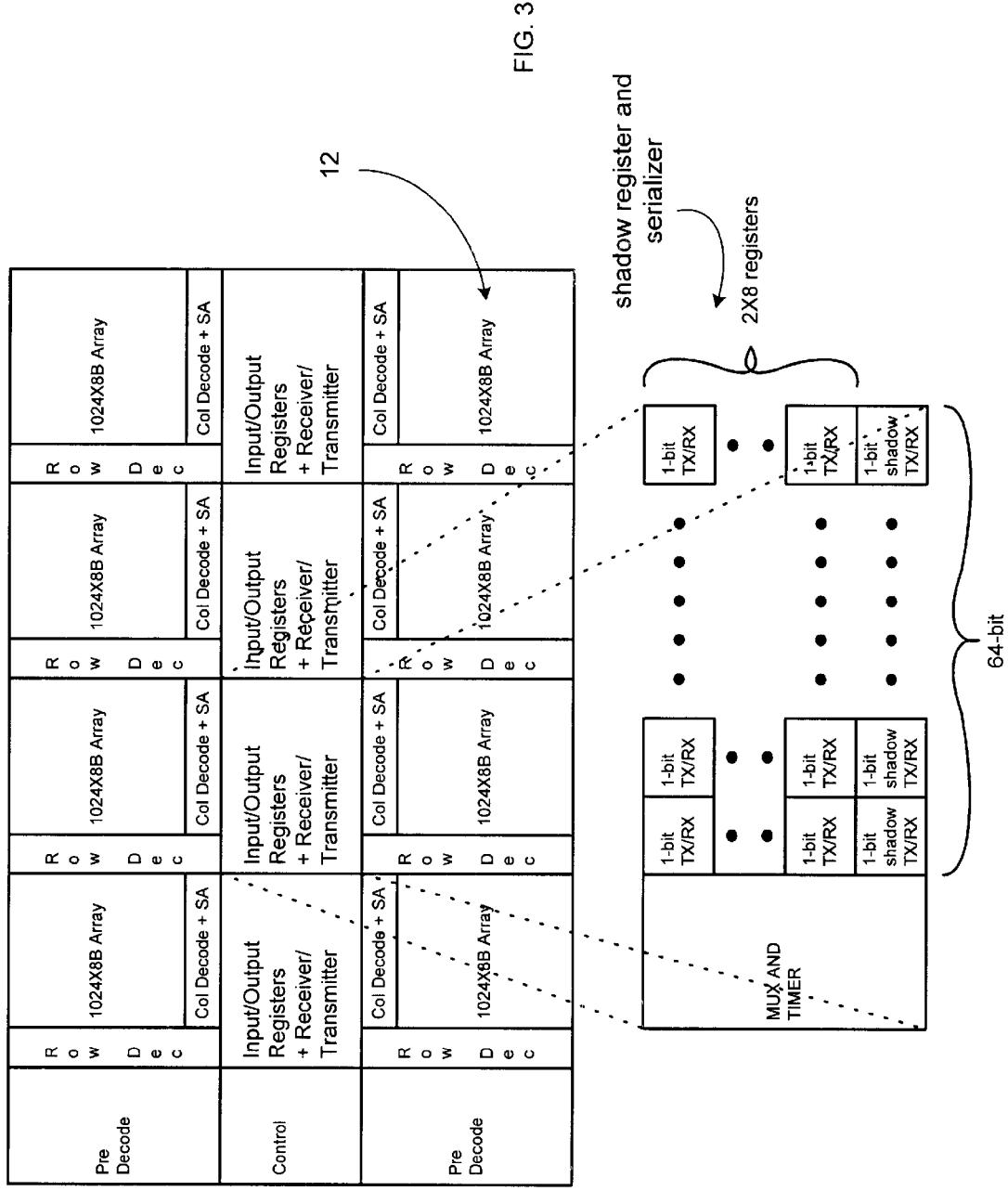
FIG. 3 is graphical representation of one embodiment of a physical configuration on a chip in accordance with one embodiment of the invention.

FIG. 3 shows one configuration of the system shown in FIG. 2 wherein the memory is a 100 MHz operation memory having eight banks of 256 rows and four columns that are eight bits wide. There may be 64 sense-amplifiers (SA) per bank. The sense amplifiers, as known in the art, amplify the signal form the memory cells to a suitable level. For each bank there is one address decoder, if desired. This may include for example, a pre-decoder and associated row and column decoders. Also, eight time slices are accommodated with the eight banks. Each bank includes the data for one time slice, and one channel of 800 megabytes per second of bandwidth per slice. As far as the transmit and receive configuration, the transmit and receive data flow from the memory may be at 800 MHz where there are eight bits per channel and each handles transmit and receive data. Depending on the state of the timer/counter residing inside the slicer, the slicer multiples the 512-bit of data into a particular shadow register. The serializer associated with that particular shadow register will then start transmitting all 512-bits of data through the transmitting channel which is 8-bits wide and 8 times faster then the memory operating speed. For all 512 bits to be completely transmitted, this serializer will take a total of 8 memory cycles (i.e. 8×8×8=512). During the other 7 memory cycles, the memory continues to provide 512 bit of data every cycle. Depending on the state of the timer/counter, the slicer multiplexes those 7 sets of 512-bits of data into the other 7 shadow registers. The other 7 serializers will then transmit those 512-bit of data from their own shadow register just like the first one does. After serving the other shadow registers during these 7 memory cycles, the slicer comes back and multiplexes a fresh set of 512 bits of data into this first shadow register just in time to keep this first serializer running at all times. When the serializer finishes transmitting the last 8-bits from the 512-bit wide shadow register, it will go back to the first 8-bits and start serializing and transmitting again without any pause.

The above description sets forth the operation from a memory read perspective. As one of ordinary skill will recognize, the system operates also to write data to memory. For example, the controllers also include serializers that provide data to deserializers (22a–22n). The shadow registers then store the deserialized data for selection by the multiplexer 16. The multiplexer 16 then passes the data to memory as a memory write operation. This flow is shown by the dashed lines in FIG. 1.

Also, it should be understood that the implementation of other variations and modifications of the invention in its various aspects will be apparent to those of ordinary skill in the art, and that the invention is not limited by the specific embodiments described. For example, the blocks described herein may be any suitable configuration. It is therefore contemplated to cover by the present invention, any and all modifications, variations, or equivalents that fall within the spirit and scope of the basic underlying principles disclosed and claimed herein.

What is claimed is:

1. A memory system comprising:

memory containing data for a plurality of controllers;

a multiplexer operatively coupled to the memory and operative to select data for transfer with the memory over a first bus at a first rate; and a multichannel serializer, operatively coupled between the multiplexer and a plurality of controllers through a plurality of second buses wherein each of the second buses is associated with a different channel, having a serializer for each of a plurality of second buses wherein each of the serializers transfers data associated with a channel at a second rate to a corresponding controller;

such that the multiplexer and multichannel serializer facilitate multiple controller access to the memory.

2. The system of claim 1 wherein the multichannel serializer obtains data from the multiplexer at a third rate over a same size bus as the first bus.

3. The system of claim 1 wherein the memory, multiplexer and multichannel serializer are located on a same circuit die.

4. The system of claim 3 including the plurality of controllers wherein the controllers are also located on the same circuit die.

5. The system of claim 3 wherein the memory system is incorporated in a video graphics controller chip.

6. The system of claim 1 wherein the multiplexer serves as a round robin time slicer to continually select a next time serializer after a predetermined interval.

7. The system of claim 1 wherein the memory includes a plurality of banks of memory blocks and an address decoder per bank and wherein the second rate is faster than the first rate and wherein a rate at which data is obtained from the multiplexer by each serializer is the same and is slower than the first and second rate.

8. The system of claim 1 wherein the multichannel serializer includes at least eight serializers corresponding to eight channels wherein each channel includes at least eight signal lines and wherein the second rate is at least about 800 MHz.

9. The system of claim 1 wherein the multiplexer obtains data from the memory at about 100 MHz and wherein the first bus includes at least 512 signal lines.

10. The system of claim 4 wherein at least one of the controllers obtains data from the memory for three-dimensional graphics manipulation and at least another of the controllers obtains data from the memory for video data display.

11. The system of claim 1 including the plurality of controllers wherein at least two controllers include de-serializers that facilitate de-serialization of data from a corresponding serializer in the multichannel serializer.

12. A memory system comprising:
memory containing data for a plurality of controllers;
a multiplexer operatively coupled to the memory and operative to select data for transfer with the memory over a first bus at a first rate; and
a multichannel serializer, operatively coupled between the multiplexer and a plurality of controllers through a plurality of second buses wherein each of the second buses is associated with a different channel, having a serializer for each of a plurality of second buses wherein each of the serializers transfers data associated with a channel at a second rate to a corresponding controller and wherein the multichannel serializer obtains data from the multiplexer at a third rate over a same size bus as the first bus;
wherein the memory includes a plurality of banks of memory blocks and an address decoder per bank and wherein the second rate is faster than the first rate and wherein a rate at which data is obtained from the multiplexer by each serializer is the same and is slower than the first and second rate;
such that the multiplexer and multichannel serializer facilitate multiple controller access to the memory and wherein the memory, multiplexer and multichannel serializer are located on a same circuit die.

13. The system of claim 12 including the plurality of controllers wherein the controllers are also located on the same circuit die.

14. The system of claim 12 wherein the memory system is incorporated in a video graphics controller chip.

15. The system of claim 12 wherein the multiplexer serves as a round robin time slicer to continually select a next time serializer after a predetermined interval.

16. The system of claim 12 wherein the multichannel serializer includes at least eight serializers corresponding to eight channels wherein each channel includes at least eight signal lines and wherein the second rate is at least about 800 MHz.

17. The system of claim 12 wherein the multiplexer obtains data from the memory at about 100 MHz and wherein the first bus includes at least 512 signal lines.

18. The system of claim 13 wherein at least one of the controllers obtains data from the memory for three-dimensional graphics manipulation and at least another of the controllers obtains data from the memory for video data display.

19. The system of claim 12 including the plurality of controllers wherein at least two controllers include de-serializers that facilitate de-serialization of data from a corresponding serializer in the multichannel serializer.

20. A method for accessing memory comprising the steps of:
selecting data for transfer with the memory over a first bus at a first rate; and
transferring data associated with a channel at a second rate through a multichannel serializer, for a plurality of controllers through a plurality of second buses wherein each of the second buses is associated with a different channel to facilitate multiple controller access to the memory.

21. The method of claim 20 including the step of obtaining through a multichannel serializer from a multiplexer at a third rate over a same size bus as the first bus.

22. The method of claim 20 wherein the method is carried out by a video graphics controller chip.

23. The method of claim 20 including the step of continually select a next time serializer after a predetermined interval in a round robin fashion.

24. The method of claim 20 including the steps of selecting data for transfer from a plurality of banks of memory blocks having an address decoder per bank and wherein the second rate is faster than the first rate and wherein a rate at which data is obtained from a multiplexer by each serializer in the multichannel serializer is the same and is slower than the first and second rate.

25. The method of claim 24 wherein the multichannel serializer includes at least eight serializers corresponding to eight channels wherein each channel includes at least eight signal lines and wherein the second rate is at least about 800 MHz.

26. The method of claim 25 wherein the multiplexer obtains data from the memory at about 100 MHz and wherein the first bus includes at least 512 signal lines.

27. The method of claim 1 including the step of obtaining data from the memory for three-dimensional graphics manipulation for at least one of the plurality of controllers and obtaining data from the memory for at least another of the controllers for video data display.

28. The method of claim 20 including the step of de-serializing data from a corresponding serializer in the multichannel serializer for use by at least one of the plurality of controllers.

* * * * *